United States Patent
Nishizawa et al.

(10) Patent No.: US 7,413,355 B2
(45) Date of Patent: Aug. 19, 2008

(54) LIGHT EMITTING MODULE AND SINGLE-FIBER TWO-WAY OPTICAL COMMUNICATION MODULE

(75) Inventors: Toshiki Nishizawa, Tokyo (JP); Yuji Mitsuhashi, Tokyo (JP); Toshiaki Uchida, Tokyo (JP)

(73) Assignee: NTT Electronics Corporation, Tokyo (JP)

( * ) Notice: Subject to any disclaimer, the term of this patent is extended or adjusted under 35 U.S.C. 154(b) by 0 days.

(21) Appl. No.: 11/423,943

(22) Filed: Jun. 13, 2006

(65) Prior Publication Data

US 2006/0280411 A1  Dec. 14, 2006

(30) Foreign Application Priority Data

Jun. 13, 2005  (JP)  ............................. 2005-172479

(51) Int. Cl.
    *G02B 6/36*  (2006.01)
(52) U.S. Cl. ......................................... 385/93; 398/138
(58) Field of Classification Search .................... 385/93
    See application file for complete search history.

(56) References Cited

U.S. PATENT DOCUMENTS

| | | | |
|---|---|---|---|
| 4,767,171 A * | 8/1988 | Keil et al. ...................... | 385/35 |
| 6,040,934 A * | 3/2000 | Ogusu et al. ................. | 398/139 |
| 6,142,680 A * | 11/2000 | Kikuchi et al. ................ | 385/93 |
| 6,454,470 B1 * | 9/2002 | Dwarkin et al. ............... | 385/93 |
| 6,488,419 B2 * | 12/2002 | Kato et al. ..................... | 385/93 |
| 6,783,284 B2 * | 8/2004 | Althaus et al. ................ | 385/92 |
| 6,954,592 B2 * | 10/2005 | Tan et al. ..................... | 398/138 |
| 6,999,661 B2 * | 2/2006 | Plickert et al. ................ | 385/38 |
| 7,153,038 B2 * | 12/2006 | Okada et al. .................. | 385/89 |

FOREIGN PATENT DOCUMENTS

JP  2003-524789  8/2003

* cited by examiner

*Primary Examiner*—Frank G Font
*Assistant Examiner*—Peter Radkowski
(74) *Attorney, Agent, or Firm*—Hogan & Hartson LLP (57) ABSTRACT

A light emitting module according to the present invention is characterized in that a light emitting device and a light-emission-side lens are held close to each other by a holding part extended from part of a stem in parallel with outgoing light of the light emitting device, and light emitted from the light emitting device is refracted. A single-fiber two-way optical communication module according to the present invention has the light emitting module and, in addition, collimate lenses close to an optical fiber and a light receiving device, and is characterized in that splitting of light to a light receiving module or coupling of light from the light emitting module is performed with parallel rays. Each of the collimate lenses condenses the parallel rays to an incident/outgoing end face of the optical fiber, condenses the parallel rays to a light receiving face of the light receiving device, and outputs, as parallel rays, outgoing light from the light emitting module.

1 Claim, 4 Drawing Sheets

LIGHT EMITTING MODULE AND SINGLE-FIBER TWO-WAY OPTICAL COMMUNICATION MODULE

The present application is based on, and claims priority from, J.P. Application 2005-172479, filed Jun. 13, 2005, the disclosure of which is hereby incorporated by reference herein in its entity.

BACKGROUND OF THE INVENTION

1. Field of the Invention

The present invention relates to a light emitting module realizing improved light coupling efficiency and a single-fiber two-way optical communication module having the light emitting module and used for two-way optical communication of a plurality of waves performed by a single fiber.

2. Description of the Related Art

Hitherto, in an optical fiber communication system, a two-way optical communication module is used for an access network system of telephone communication or the like (refer to, for example, Japanese Patent Application National Publication Laid-open No. 2003-524789).

In an optical communication module disclosed in Japanese Patent Application National Publication Laid-open No. 2003-524789, a light emitting module and a light receiving module which are held in a single casing transmit/receive light via a lens coupling optical device and a beam splitter disposed close to an end of an optical fiber. Each of the light emitting module, the light receiving module, and the optical fiber does not have a mechanism of adjusting the optical axis direction, and the light emitting module and the light receiving module are parts separate from the casing.

In the optical communication module, the optical axis direction of the light emitting module is not adjusted, so that the coupling efficiency varies. Since an optical filter is inserted in nonparallel rays, aberration occurs and the coupling efficiency is low. Accordingly, the light coupling efficiency of the optical communication module is low. Since the optical axis direction of the light receiving module is not adjusted, light receiving efficiency of the light receiving module is low. Consequently, in the optical communication module, the light coupling efficiency varies.

SUMMARY OF THE INVENTION

To solve the problem, an object of the present invention is to provide a light emitting module and a single-fiber two-way optical communication module realizing improved light coupling efficiency.

A light emitting module according to the present invention is characterized in that a light emitting device and a light-emission-side lens are held by a holding part extended from part of a stem in a direction parallel with outgoing light of the light emitting device, and light from the light emitting device refracted by the light-emission-side lens is emitted. A single-fiber two-way optical communication module according to the present invention has a module for emitting or receiving parallel rays and a lens for converting outgoing light from an optical fiber to parallel rays, and is characterized in that splitting of light to a light receiving module or coupling of light from the light emitting module is performed with parallel rays.

Concretely, the light emitting module according to the invention includes: a light emitting device for emitting light; a light-emission-side lens for refracting outgoing light emitted from the light emitting device; a heat sink having thereon the light emitting device and dissipating heat from the light emitting device; and a stem having a column-shaped holding part which extends in a direction parallel with an outgoing direction of the light emitting device and holding the light-emission-side lens and the heat sink on a side face of the holding part.

Since the light emitting device and the light-emission-side lens are held close to each other by the holding part, outgoing light emitted from the light emitting device can be efficiently refracted by the light-emission-side lens. Therefore, the light emitting module realizing improved light coupling efficiency can be provided.

Preferably, the light emitting module according to the invention further includes a sealing cap for sealing the light emitting device, the light-emission-side lens, the heat sink, and the holding part and having a transmission window that transmits the outgoing light refracted by the light-emission-side lens, and the transmission window is tilted only by a predetermined angle from a plane perpendicular to a center axis of a beam of the outgoing light.

Since the light emitting device can be disposed in the sealed space, the light emitting device can emit light stably. In addition, the influence of the external environment of the light emitting device can be reduced. Further, the transmission window and the center axis of a beam of outgoing light are not orthogonal to each other, so that return light from the transmission window can be prevented from returning to the light emitting device, and the light emitting device can perform stable operation.

Preferably, the light-emission-side lens refracts the outgoing light to parallel rays. Since the light-emission-side lens converts the outgoing light to parallel rays, the light emitting module can easily adjust the coupling system. Since the light emitting module can emit parallel rays, aberration which occurs when light passes through the optical isolator and the optical filter can be reduced. Therefore, the light emitting module realizing improved light coupling efficiency can be provided.

A single-fiber two-way optical communication module according to the present invention includes: at least one light emitting module including a light emitting device for emitting light, a light-emission-side lens for refracting outgoing light emitted from the light emitting device to parallel rays, a heat sink having thereon the light emitting device and dissipating heat from the light emitting device, and a stem having a column-shaped holding part which extends in a direction parallel with an outgoing direction of the light emitting device, and holding the light-emission-side lens and the heat sink on a side face of the holding part; an optical fiber holding sleeve for holding an optical fiber whose incident/outgoing end face is disposed in a predetermined position; an optical-fiber-side lens for refracting light emitted from the predetermined position to parallel rays in a predetermined optical path and condensing the parallel rays entered from the predetermined optical path to the predetermined position; at least one optical filter disposed on the predetermined optical path, for splitting the parallel rays in the predetermined optical path or coupling the parallel rays in an optical path crossing the predetermined optical path to the predetermined optical path; at least one light-reception-side lens for condensing the parallel rays to a predetermined focal point; at least one light receiving module including a light receiving device for receiving the light condensed to the predetermined focal point; at least one light receiving module holding ring for holding the light receiving module; at least one light receiving module holding sleeve for holding the light receiving module holding ring on the inside of a cylinder having a center axis almost parallel with the optical axis of the light-reception-side lens and making a light receiving surface of the light receiving device and the predetermined focal point coincide with each other; and a casing for holding the optical fiber holding sleeve, the optical-fiber-side lens, the optical filter, the light emitting module, and the light-reception-side lens, and holding the light receiving module holding sleeve on a plane almost perpendicular to the optical axis of the light-reception-side lens. The light emitting module is disposed on the predetermined optical path or an optical path where the emitting light from the light emitting device is directed to the optical-fiber-side lens by the optical filter so that an outgoing direction of the light emitting device is set toward the optical filter, and the light receiving module is disposed on the predetermined optical path or an optical path split from parallel rays in the predetermined optical path by the optical filter so that a direction from the predetermined focal point to an optical center of the light-reception-side lens is set toward the optical filter.

The single-fiber two-way optical communication module according to the present invention has the optical-fiber-side lens, the light-emission-side lens, and the light-reception-side lens, and can perform splitting of light to the light receiving module and coupling of light from the light emitting module with parallel rays. Consequently, aberration which occurs at the time of coupling or splitting light can be prevented, and adjustment of the coupling system can be facilitated. Further, the optical-fiber-side lens condenses the parallel rays to a predetermined position corresponding to the incident/outgoing end face of the optical fiber, so that outgoing light of the light emitting module can efficiently enter the optical fiber. Further, the reception-side lens condenses parallel rays to the predetermined focal point in the light receiving face of the light receiving device, so that light emitted from the optical fiber can efficiently enter the light receiving device. Further, since the light receiving module holding sleeve is held by the casing on a plane almost perpendicular to the optical axis of the light-reception-side lens, adjustment can be performed so that the light receiving device can receive light in an almost center of the light receiving face before the light receiving module holding sleeve is fixed. Since the single-fiber two-way optical communication module according to the invention has a light receiving module holding sleeve and a light receiving module holding ring, three-dimensional adjustment of the light receiving module can be performed, and light coupling efficiency can be improved.

Preferably, the single-fiber two-way optical communication module according to the present invention further includes an isolator between the light emitting module and the optical filter, the isolator for passing outgoing light emitted from the light emitting module to the optical filter and interrupting return light to the light emitting module, which is reflected by the optical filter or an incident/outgoing end face of the optical fiber.

Since the return light to the light emitting module can be interrupted, the light emitting device can perform stable operation. Since an optical part is disposed in a parallel beam, a beam incident angle to the optical part becomes constant. Therefore, aberration which occurs can be reduced and the coupling efficiency can be improved.

Preferably, the casing further includes an optical-fiber-side lens holder for holding the optical-fiber-side lens in a position in which the optical center of the optical-fiber-side lens is disposed on an optical axis of light emitted from the optical fiber.

Since the optical axis of light emitted from the optical fiber and a straight line connecting the predetermined position and the optical center of the optical-fiber-side lens can be almost coincided with each other, the optical-fiber-side lens can efficiently convert light emitted from the optical fiber to parallel rays. Since the optical-fiber-side lens holder can perform adjustment in the direction perpendicular to the optical axis, the optical axis of parallel rays emitted from the light emitting module can be easily deflected. Thus, light can enter the optical fiber at the optimum incident angle, and coupling efficiency can be improved.

Preferably, as the optical-fiber-side lens, focal point of the optical-fiber-side lens almost coincides with a plane of connection between the casing and the optical fiber holding sleeve.

Since the incident/outgoing end face of the optical fiber can be disposed at an end of the optical fiber holding sleeve, an optical axis shift which occurs at the time of fixing the optical fiber to the casing can be reduced. Therefore, coupling efficiency can be improved.

Preferably, the plane of connection between the casing and the optical fiber holding sleeve is almost perpendicular to the optical axis of the optical fiber, and the optical fiber holding sleeve holds the optical fiber on the inside of a cylinder having a center axis almost parallel with the optical axis of the optical fiber and is fixed to the casing with a flange provided at an end of the cylinder.

Since the optical fiber holding sleeve can hold the optical fiber on the inside of a cylinder having a center axis almost parallel with the optical axis of the optical fiber, the angle of the incident/outgoing end face of the optical fiber can be maintained constant at the time of adjusting the optical axis direction. Since the optical axis direction can be adjusted easily, the coupling efficiency can be improved. Since the optical fiber holding sleeve is fixed to the casing on a plane almost perpendicular to the optical axis of the optical fiber, the flange fixing position of the optical fiber holding sleeve can be adjusted so that the predetermined position lies on the optical axis of the optical fiber. Therefore, an axis shift amount in a plane direction perpendicular to the optical axis can be decreased. The light condensed by the optical-fiber-side lens can be made efficiently enter the optical fiber, and light emitted from the optical fiber can be efficiently converted to parallel rays. Thus, the coupling efficiency can be improved.

By the present invention, the light emitting module realizing improved light coupling efficiency and the single-fiber two-way optical communication module can be provided.

DESCRIPTION OF PREFERRED EMBODIMENTS

Embodiments of the present invention will be described with reference to the attached drawings. The embodiments described below relate to examples of the configuration of the present invention, and the present invention is not limited to the following embodiments.

Figure 1:
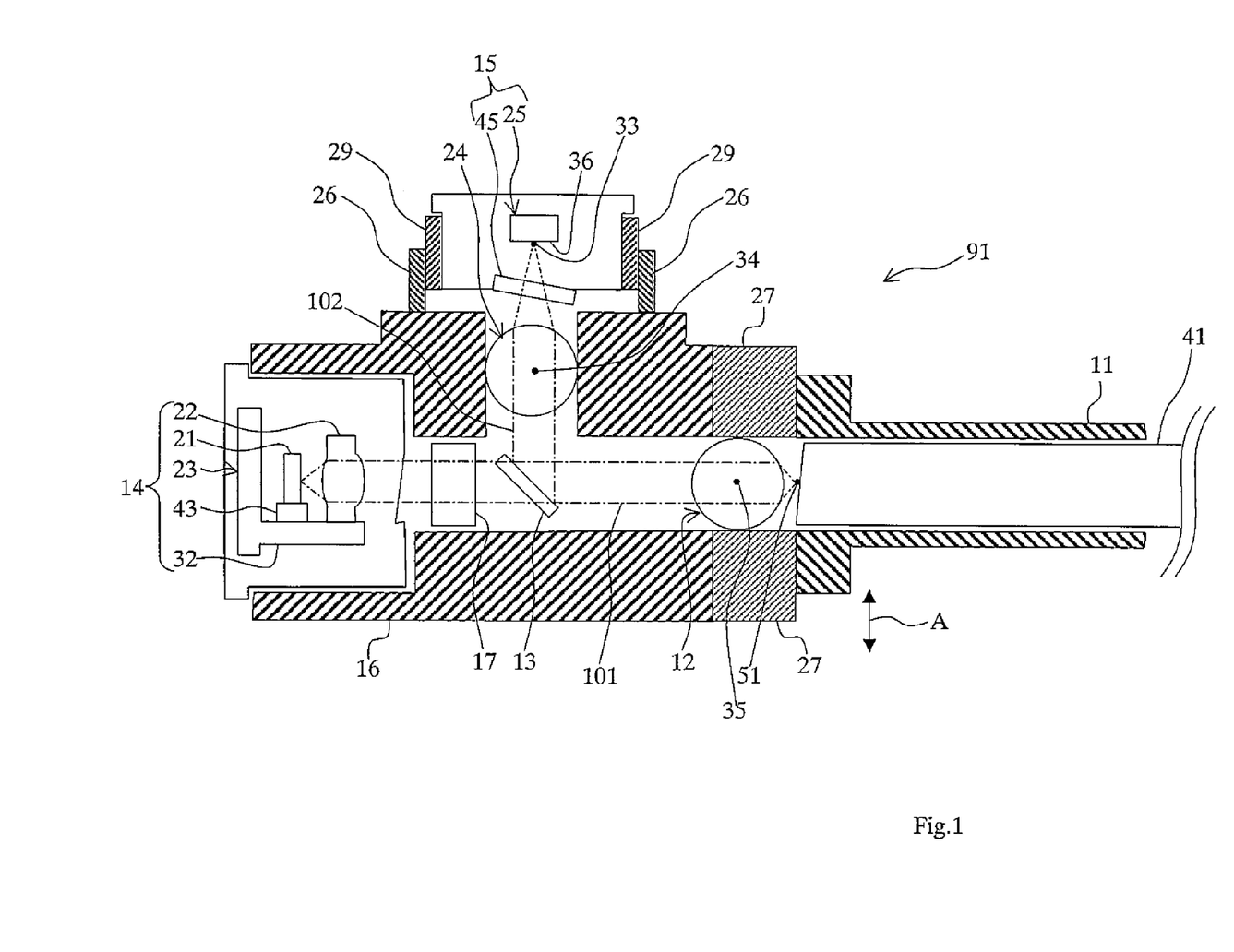
FIG. 1 is a schematic view showing an example of a single-fiber two-way optical communication module according to an embodiment of the invention.

FIG. 1 is a schematic view showing an example of a single-fiber two-way optical communication module according to the embodiment. A single-fiber two-way optical communication module 91 shown in FIG. 1 has: at least one light emitting module 14 including a light emitting device 21 for emitting light, a light-emission-side lens 22 for refracting outgoing light emitted from the light emitting device 21 to parallel rays, a heat sink 43 having the light emitting device 21 thereon, for dissipating heat from the light emitting device 21, a column-shaped holding part 32 extending in the direction parallel with the light outgoing direction of the light emitting device 21, and a stem 23 for holding the light-emission-side lens 22 and the heat sink 43 on a side face of the holding part 32; an optical fiber holding sleeve 11 for holding an optical fiber 41 whose light incident/outgoing end face is disposed in a predetermined position 51; an optical-fiber-side lens 12 for refracting light emitted from the predetermined position 51 to parallel rays in a predetermined optical path 101 and condensing the parallel rays incident from the predetermined optical path 101 to the predetermined position 51; at least one optical filter 13 disposed on the predetermined optical path 101, for splitting the parallel rays in the predetermined optical path 101 or coupling the parallel rays of an optical path 102 crossing the predetermined optical path 101 to the predetermined optical path 101; at least one light-reception-side lens 24 for condensing the parallel rays of the optical path 102 to a predetermined focal point 33; at least one light receiving module 15 including a light receiving device 25 for receiving the light condensed to the predetermined focal point 33; at least one light receiving module holding ring 29 for holding the light receiving module 15; at least one light receiving module holding sleeve 26 for holding the light receiving module holding ring 29 on the inside of a cylinder having a center axis almost parallel with the optical axis of the light-reception-side lens 24 and making a light receiving surface 36 of the light emitting device 25 and the predetermined focal point 33 coincide with each other; and a casing 16 for holding the optical fiber holding sleeve 11, optical-fiber-side lens 12, optical filter 13, light emitting module 14, and light-reception-side lens 24, and holding the light receiving module holding sleeve 26 on a plane almost perpendicular to the optical axis of the light-reception-side lens 24.

Further, the single-fiber two-way optical communication module 91 includes an isolator 17 that transmits the outgoing light emitted from the light emitting module 14 to the optical filter 13 and interrupts return light to the light emitting module 14, which is reflected by the optical filter 13 and/or the incident/outgoing end face of the optical fiber 41. The casing 16 includes an optical-fiber-side-lens holder 27 that holds the optical-fiber-side lens 12.

In FIG. 1, the incident/outgoing end face of the optical fiber 41, optical-fiber-side lens 12, optical filter 13, isolator 17, and light emitting module 14 are disposed in order on the predetermined optical path 101. The light emitting module 14 is disposed so that the outgoing direction of the light emitting device 21 is set toward the optical filter 13. The light receiving module 15 is disposed on the optical path 102 split from the predetermined optical path 101 by the optical filter 13. The light receiving module 15 is disposed so that the direction from the predetermined focal point 33 to an optical center 34 of the light-reception-side lens 24 is directed toward the optical filter 13. The optical path 102 is preferably almost orthogonal to the optical path 101.

As the optical fiber 41, for example, an optical fiber obtained by covering a bare fiber with a reinforcing member of the optical fiber can be used. Examples of the reinforcing member of the optical fiber are tubes of nylon, Teflon (registered trademark), vinyl chloride, and stainless steel. The reinforcing member of the optical fiber may be a flexible tube. The reinforcing material of the optical fiber is preferably SUS (special use stainless steel). The optical fiber 41 may be provided with a ferrule. A ferrule made of, for example, zirconia or a resin can be used. Preferably, the optical fiber 41 is constructed by a plurality of layers. For example, the optical fiber 41 in which the bare fiber is covered with zirconia, and zirconia is covered with SUS may be used.

The optical fiber holding sleeve 11 holds the optical fiber 41 whose incident/outgoing end face is disposed in the predetermined position 51. The incident/outgoing end face of the optical fiber 41 is a face from which light propagated through the optical fiber 41 goes out and through which light enters the optical fiber 41. The predetermined position 51 is the focal point of the optical-fiber-side lens 12. Preferably, the predetermined position 51 coincides with the plane of connection between the casing 16 and the optical-fiber-holding sleeve 11. In the case where the optical-fiber-side lens holder 27 is provided, preferably, the predetermined position 51 coincides with the plane of connection between the optical-fiber-side holder 27 and the optical fiber holding sleeve 11. When the incident/outgoing end face of the optical fiber 41 is disposed in the position coincided with the plane of connection between the casing 16 or the optical-fiber-side lens holder 27 and the optical fiber holding sleeve 11, an optical axis shift of the optical fiber 41 which occurs at the time of fixing the optical fiber 41 can be reduced. Examples of the material of the optical fiber holding sleeve 11 are aluminum, stainless steel, and high-temperature polymer. To hold the optical fiber 41, for example, a mechanical fixing mechanism, adhesion, or welding can be used. As the mechanical fixing mechanism, for example, a screw can be used. As the welding, vibration welding, ultrasonic welding, or thermal welding can be used. As the welding, it is preferable to use laser welding which is performed by emitting a laser beam. Examples of the laser beam used for the laser welding are a YAG laser and a semiconductor laser.

Preferably, the optical fiber holding sleeve 11 holds the optical fiber 41 on the inside of a cylinder having a center axis almost parallel with the optical axis of the optical fiber 41. The optical axis of the optical fiber 41 may be set to, for example, the center axis of the optical fiber holding sleeve 11. Further, the optical axis of the optical fiber 41 may be set to the predetermined optical path 101 or the optical axis of the optical-fiber-side lens 12. The inside of the cylinder denotes the hollow portion of the cylinder. The inside diameter of the cylinder is larger than the outside diameter of the optical fiber 41 held. The inside diameter of the cylinder is preferably almost the same as the outside diameter of the optical fiber 41 held. The length in the center axis direction of the cylinder is preferably a length in which the optical axis of the optical fiber 41 can be maintained constant. Since the optical fiber 41 is held on the inside of the cylinder having the center axis almost parallel with the optical axis of the optical fiber 41, the optical axis direction can be adjusted while maintaining the angle of the incident/outgoing end face of the optical fiber. Therefore, the incident/outgoing end face of the optical fiber 41 can be disposed in the predetermined position 51.

Preferably, an end of the cylinder of the optical fiber holding sleeve 11 has a flange which is fixed to the casing 16. In this case, it is preferable that the flange of the optical fiber holding sleeve 11 be fixed to the casing 16 on a plane almost perpendicular to the optical axis of the optical fiber 41. The plane to be fixed to the casing 16 of the flange is preferably a plane almost perpendicular to the optical axis of the optical fiber 41. Alternately, the plane to be fixed to the casing 16 of the flange may be a plane almost perpendicular to the center axis of the cylinder that holds the optical fiber 41. The plane to be fixed to the casing 16 is preferably smaller than the plane of the casing 16 for holding the optical fiber holding sleeve 11. Since the plane to be fixed to the optical fiber holding sleeve 11 and the casing 16 is a plane almost perpendicular to the optical axis of the optical fiber 41, the casing 16 can move the position of fixing the optical fiber holding sleeve 11 in the direction A. Therefore, the optical fiber holding sleeve 11 can be fixed to the casing 16 in a position in which the fixing position of the flange of the optical fiber holding sleeve 11 is adjusted in the direction A so that the predetermined position 51 lies on the optical axis of the optical fiber 41. The direction A is, for example, one direction in a plane almost perpendicular to the optical axis of light emitted from the optical fiber 41. The direction A may be a one-dimensional direction or two-dimensional direction. In the case where the optical-fiber-side lens holder 27 is disposed between the casing 16 and the optical fiber holding sleeve 11, the casing 16 may fix the optical fiber holding sleeve 11 via the optical-fiber-side lens holder 27.

Preferably, the casing 16 includes the optical-fiber-side lens holder 27. The optical-fiber-side lens holder 27 holds the optical-fiber-side lens 12. The optical-fiber-side lens 12 may be held in the position where an optical center 35 of the optical-fiber-side lens 12 lies on the optical axis of light emitted from the optical fiber 41.

The optical-fiber-side lens holder 27 can move the position of the optical fiber holding sleeve 11 in the direction A and, preferably, can fix the optical fiber holding sleeve 11 to the casing 16 in the position in which the optical axis of light emitted from the optical fiber 41 almost coincides with the straight line connecting the predetermined position 51 and the optical center 35 of the optical-fiber-side lens 12. The optical-fiber-side lens holder 27 and the optical fiber holding sleeve 11 can be fixed to each other by using, for example, a mechanical fixing mechanism, adhesion, or welding. As the mechanical fixing mechanism, for example, a screw can be used. As the welding, vibration welding, ultrasonic welding, or thermal welding can be used. As the welding, it is preferable to use laser welding which is performed by emitting a laser beam. Examples of the laser used for the laser welding are a YAG laser and a semiconductor laser. The optical axis of light emitted from the optical fiber 41 can be measured, for example, in a state where the optical fiber 41 is held in the optical fiber holding sleeve 11. The optical-fiber-side lens holder 27 may change the angle of the direction A with respect to the optical axis of light emitted from the optical fiber 41.

When the position of the optical fiber holding sleeve 11 is movable, even if parallel rays emitted from the light emitting module 14 are shifted, by adjusting the optical-fiber-side lens holder 27 in the direction A, the optical axis can be corrected. To prevent return light from the incident/outgoing end face of the optical fiber 41, the incident/outgoing end face of the optical fiber 41 is tilted at a predetermined angle. To make light efficiently enter the incident/outgoing end face of the optical fiber 41 tilted at a predetermined angle, light has to be condensed by bending the optical axis of the parallel rays emitted from the light emitting module 14 at the predetermined angle. By moving the optical-fiber-side lens holder 27 in the direction A, light can be condensed while bending the optical axis at the predetermined angle. Therefore, light can efficiently enter the optical fiber 41, and the coupling efficiency can be improved.

Preferably, the optical-fiber-side holder 27 holds the optical-fiber-side lens 12 in a position where the optical center 35 of the optical-fiber-side lens 12 overlaps the predetermined optical path 101. Since the optical axis of light emitted from the optical fiber 41 and the straight line connecting the predetermined position 51 and the optical center 35 of the optical-fiber-side lens 12 can be made almost coincided, the optical-fiber-side lens 12 can efficiently convert the light emitted from the optical fiber 41 to parallel rays. The light condensed by the optical-fiber-side lens 12 can efficiently enter the incident/outgoing end face of the optical fiber 41. Thus, the coupling efficiency can be improved.

The optical-fiber-side lens 12 refracts light emitted from the predetermined position 51 to make parallel rays in the predetermined optical path 101, and condenses the parallel rays entering from the predetermined optical path 101 to the predetermined position 51. The predetermined optical path 101 is an optical path of parallel rays passed through the optical-fiber-side lens 12. As the optical-fiber-side lens 12, a collimator lens for converting light from a point light source to parallel rays can be used. Examples of the collimator lens are a convex aspherical lens, a plano-convex lens, a ball lens, a hemispherical lens, an angular aspherical lens, and a cylindrical aspherical lens. The optical-fiber-side lens 12 may be a single lens or a compound lens of two or more lenses. Preferably, the plane of connection between the casing 16 and the optical fiber holding sleeve 11 and the focal point of the optical-fiber-side lens 12 almost coincide with each other. That is, preferably, the predetermined position 51 almost coincides with the plane of connection between the casing 16 and the optical fiber holding sleeve 11. Since the end face of the optical fiber can be disposed at an end of the optical fiber holding sleeve, an optical axis shift which occurs at the time of fixing the optical fiber can be reduced, and the coupling efficiency can be improved.

The optical filter 13 is provided to split the parallel rays in the predetermined optical path 101 or couple the parallel rays to the predetermined optical path 101. For example, the optical filter 13 in FIG. 1 reflects and splits the parallel rays in the optical path 101 and transmits the parallel rays emitted from the light emitting module 14 to the optical-fiber-side lens 12. As the optical filter 13, for example, a beam splitter or a multilayer film filter such as a half mirror that transmits part of the parallel rays and reflects part of the parallel rays can be used.

Figure 2:
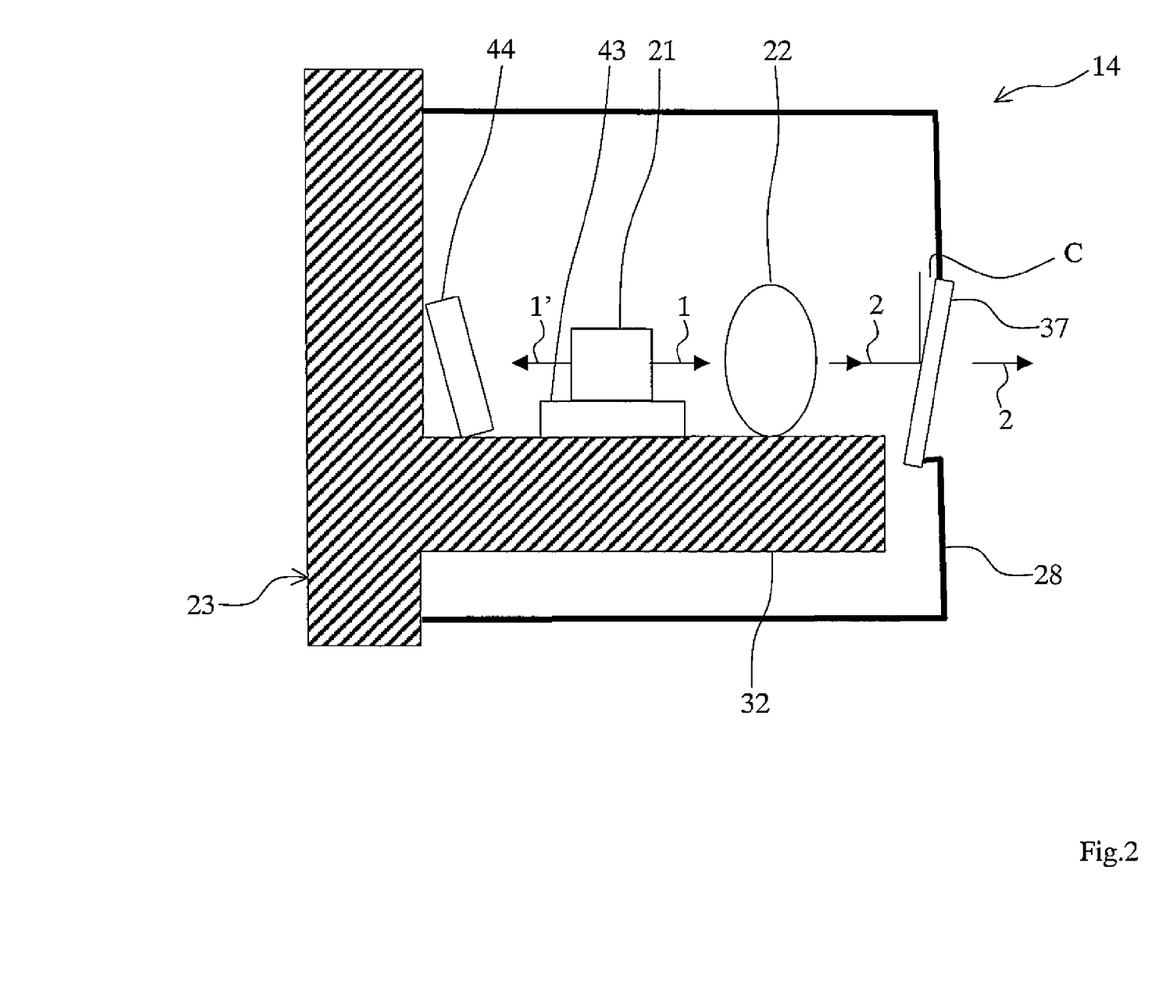
FIG. 2 is a schematic view showing an example of a light emitting module.

FIG. 2 is a schematic view showing an example of the light emitting module. The light emitting module 14 shown in FIG. 2 includes: the light emitting device 21 for emitting light; the light-emission-side lens 22 for refracting outgoing light emitted from the light emitting device 21 to make parallel rays; the heat sink 43 having the light emitting device 21 thereon, for dissipating heat from the light emitting device; and the stem 23 having the column-shaped holding part 32 extending in the direction parallel with the outgoing direction of the light emitting device 21 and holding the light-emission-side lens 22 and the heat sink 43 on the side face of the holding part 32. The light emitting module 14 further includes a sealing cap 28 sealing the light-emission-side lens 22, heat sink 43, and holding part 32 and having a transmission window 37 for passing outgoing light refracted by the light-emission-side lens 22, and a light receiving device 44 for receiving outgoing light 1' emitted from the light emitting device 21.

The light emitting device 21 emits outgoing light 1. As the light emitting device 21, for example, a laser diode (LD), a light emitting diode (LED), a super-luminescent diode, an edge-emitting-type light emitting laser, or a surface-emitting laser can be used. The characteristics such as wavelength, amplitude, and phase of outgoing light are not limited. The wavelength of light emitted from the light emitting device 21 may lie in a wavelength band, for example, from 760 nm to 2400 nm. The wavelength may be 850 nm, 1310 nm, or 1550 nm.

The heat sink 43 has thereon the light emitting device 21, and dissipates heat from the heat emitting device 21. For example, a member made of Si material or a metal material such as Al or Cu can be used. Further, AlN (aluminum nitride) and CuW (copper tungsten) having excellent thermal conductivity and having coefficient of thermal expansion close to that of the light emitting device are preferable. The heat sink 43 is preferably disposed between the holding part 32 and the light emitting device 21.

The light-emission-side lens 22 refracts the outgoing light 1 emitted from the light emitting device 21 so that the outgoing light 1 becomes parallel rays. As the light-emission-side lens 22, a lens similar to the optical-fiber-side lens 12 can be used. For example, a convex aspherical lens, a ball lens, a hemispherical lens, an angular aspherical lens, or a cylindrical aspherical lens can be used. The light-emission-side lens 22 may be a single lens or a compound lens. The light-emission-side lens 22 is, preferably, a surface-mounting type angular aspherical lens. When the light-emission-side lens 22 is a surface-mounting type angular aspherical lens, light can be converted to parallel rays with high precision. Since the light-emission-side lens converts light to parallel rays, the light emitting module 14 can easily adjust a coupling system with the optical filter 13 shown in FIG. 1 or a coupling system with the optical fiber 41 shown in FIG. 1.

The stem 23 holds the light-emission-side lens 22 and the heat sink 43. The stem 23 has the column-shaped holding part 32 extending in parallel with the outgoing direction of the light emitting device 21 and holds the heat sink 43, the light emitting device 21, and the light-emission-side lens 22 on the side face of the holding part 32. The outgoing direction of the light emitting device 21 is, for example, the direction of the center axis of a beam of outgoing light from the light emitting device 21. The shape of the holding part 32 is not limited and may be, for example, a circular column, a rectangular column, a cone, a pyramid, or a part of any of these shapes. The holding operation can be performed by using, for example, a mechanical fixing mechanism using a screw, adhesion, or welding.

Preferably, the light emitting module 14 has the sealing cap 28. The sealing cap 28 seals the light emitting device 21, light-emission-side lens 22, heat sink 43, and holding part 32, and has the transmission window 37 that transmits the outgoing light refracted by the light-emission-side lens 22. As the sealing cap 28, a cap that seals the heat sink 43, light emitting device 21, light-emission-side lens 22, and holding part 32 on the face of the holding part 32 side in the stem 23 as shown in FIG. 2 can be used. The sealing cap 28 may seal the stem 23, light-emission-side lens 22, and holding part 32. The inside of the sealing cap 28 is preferably filled with an inert gas in which moisture is reduced. As the inert gas, for example, $N_2$ gas can be used. A desiccant agent may be also sealed therein. By providing the sealing cap, the light emitting device 21 can emit light in a state where the influence of external environment is small, so that the light emission efficiency of the light emitting device 21 can be improved. In addition, the light emission characteristics of the light emitting device 21 can be prevented from degrading.

The transmission window 37 is preferably tilted only by a predetermined angle C from a plane perpendicular to the center axis of a beam of the outgoing light 1. The transmission window 37 is made of, for example, an optical material transmitting the outgoing light 1 having a wavelength emitted from the light emitting device 21. As optical materials, when light emitted from the light emitting device 21 is infrared light, glass containing Si, borosilicate glass, sapphire glass, or ZnS (zinc sulfide) can be used. The predetermined angle C is an angle except for 0 degree. For example, the predetermined angle C may be equal to or larger than one degree and less than 90 degrees. The predetermined angle C may be larger than zero and less than one degree. The predetermined angle C may be, for example, 8 degrees, 10 degrees, or 11 degrees. Since the transmission window 37 transmits light 2 emitted from the light emitting device 21, the sealing cap 28 can transmit the light 2 emitted from the light emitting device 21 with the minimum light loss. Since the angle of incidence on the transmission window 37 is tilted only by the predetermined angle C, return light to the light-emission-side lens 22 and the light emitting device 21 is prevented and the light emitting device can perform stable operation. In addition, degradation of the light emission characteristics of the light emitting device 21 can be prevented.

Preferably, the light emitting module 14 has the light receiving device 44. The light receiving device 44 receives the outgoing light 1' from the light emitting device 21. The light receiving device 44 can control the outgoing light 1 emitted from the light emitting device 21. As the light receiving device 44, for example, a device similar to the light emitting device 25 shown in FIG. 1 which will be described later can be used. The light receiving device 44 is preferably tilted to prevent return light to the light emitting device.

As described above, the light-emission-side lens 22 is disposed close to the light emitting device 21 on the holding part 32, so that the light-emission-side lens 22 can efficiently refract the outgoing light 1 emitted from the light emitting device 21. Further, the light-emission-side lens 22 can efficiently convert the outgoing light 1 emitted from the light emitting device 21 to the parallel rays 2. Therefore, aberration which occurs when outgoing light from the light emitting module 14 is coupled by the optical filter 13 shown in FIG. 1 is prevented, and adjustment of the coupling system with the optical fiber 41 can be facilitated. The light emitting module realizing improved light coupling efficiency can be provided. Further, by welding the casing 16 and the light emitting module 14, an indirect part for holding the light emitting module 14 can be made unnecessary. Therefore, heat resistance from the light emitting device 21 to the casing 16 is reduced, so that the heat dissipating characteristic of the light emitting device 21 can be improved.

In FIG. 1, the light receiving module 15 includes the light receiving device 25 for receiving light condensed to the predetermined focal point 33. The light receiving module 15 may include a wavelength selection filter 45 transmitting light having a reception wavelength emitted from the optical fiber 41 and interrupting light of unnecessary wavelength such as a transmission wavelength emitted from the light emitting device 21.

The light-reception-side lens 24 condenses the parallel rays to the predetermined focal point 33. As the light-reception-side lens 24, a lens similar to the optical-fiber-side lens 12 can be used. For example, a convex aspherical lens, a ball lens, a hemispherical lens, an angular aspherical lens, or a cylindrical aspherical lens can be used. The light-reception-side lens 24 maybe a single lens or a compound lens.

The light receiving device 25 receives light condensed to the predetermined focal point 33. As the light receiving device 25, for example, a photodiode such as a PIN photodiode, a silicon photodiode, or an avalanche photodiode can be used. The characteristics such as wavelength, amplitude, and phase of receiving light are not limited. The wavelength of reception light may lie in a wavelength band, for example, from 760 nm to 2400 nm. The wavelength may be 850 nm, 1310 nm, or 1550 nm.

Preferably, the light receiving module 15 has the wavelength selection filter 45. For example, the wavelength selection filter 45 transmits light having a reception wavelength emitted from the optical fiber 41 and interrupts light having an unnecessary wavelength such as a transmission wavelength emitted from the light emitting device 21. The unnecessary wavelength is a wavelength except for the wavelength received by the light receiving device 25. As the wavelength selection filter 45, a filter which transmits light having a predetermined wavelength can be used. Examples of the filter which transmits light having a predetermined wavelength are a fiber Bragg grating, a multilayered interference film, a holey fiber, and a photonic crystal. Preferably, the incident face of the wavelength selection filter 45 is tilted, not perpendicular with respect to the incident direction of the light from the optical path 102. It is also preferable that the wavelength selection filter 45 be used as an incident window of an air hermetic sealing cap which hermetically seals the light receiving module. By integrating the wavelength selection filter 45 and the hermetic sealing cap, the number of parts is decreased and the module can be miniaturized.

The light receiving module holding ring 29 holds the light receiving module 15. The light receiving module holding ring 29 is positioned on the side face of the light receiving module 15, and a light receiving module holding sleeve 26 is disposed on the outer periphery of the light receiving module holding ring 29. The light receiving module holding ring 29 may be provided around the side face adjacent to the light receiving surface of the light receiving module 15.

The light receiving module holding sleeve 26 holds the light receiving module holding ring 29 by the inside of a cylinder having a center axis almost parallel with the optical axis of the light-reception-side lens 24 to make the light receiving surface 36 of the light receiving device 25 and the predetermined focal point 33 coincide with each other. The cylinder of the light receiving module holding sleeve 26 may have a center axis parallel with the optical axis of the optical path 102. The inside of the cylinder denotes the hollow portion of the cylinder. Preferably, the inside diameter of the cylinder is larger than the outside diameter of the portion in which the light receiving device is disposed in the light receiving module 15. The holding operation can be performed mechanically or by adhesion or welding. The light receiving module 15 may be detachable. The fixing operation is performed desirably by spot welding using a laser beam of a YAG laser or the like so that distortion can be reduced at each spot.

Since the light receiving module holding sleeve 26 can move the light receiving module holding ring 29 in the optical axis direction, the optical axis direction can be adjusted. Adjustment in a plane direction can be performed by the light receiving module holding sleeve 26 and the casing 16. Even if light reflected from the optical filter 13 enters the light receiving module 15 with a tilted optical axis, the light receiving module holding ring 29 and the light receiving module holding sleeve 26 can perform three-dimensional adjustment so that light can enter efficiently the light receiving device 25. Further, the light receiving device 25 can be disposed so that an almost center of the light receiving surface 36 is disposed on a straight line connecting the predetermined focal point 33 and the optical center 34 of the light-reception-side lens 24. Consequently, the light receiving module holding sleeve 26 can make the light receiving surface 36 of the light receiving device 25 directed to the light-reception-side lens 24. Therefore, the light receiving device 25 can efficiently receive parallel rays in the optical path 102.

The casing 16 shown in FIG. 1 holds the optical fiber holding sleeve 11, optical-fiber-side lens 12, optical filter 13, light emitting module 14, light-reception-side lens 24, and light receiving module holding sleeve 26. The light emitting module 14 can be detached from the casing 16. Preferably, the casing 16 holds the optical fiber holding sleeve 11 on a plane almost perpendicular to the optical axis of the optical fiber 41. When the plane to which the optical fiber holding sleeve 11 and the casing 16 are fixed is a plane almost perpendicular to the optical axis of the optical fiber 41, the casing 16 can fix the optical fiber holding sleeve 11 in a position where the fixing position of the flange of the optical fiber holding sleeve 11 is adjusted in the direction A so that the predetermined position 51 lies on the optical axis of the optical fiber 41. The optical fiber holding sleeve 11 and the light emitting module 14 may be held by the fixing using adhesion or the like. Further, the casing 16 holds the light receiving module holding sleeve 26 on a plane almost perpendicular to the optical axis of the light-reception-side lens 24. Alternately, the casing 16 may hold the light receiving module holding sleeve 26 on a plane almost perpendicular to the optical path 102. When the casing 16 holds the light receiving module holding sleeve 26 on such a plane, the light receiving module holding sleeve 26 can be moved and held. Therefore, the casing 16 can hold the light receiving module holding sleeve 26 in a position where the predetermined focal point 33 lies in the center of the light receiving device 25.

Preferably, the single-fiber two-way optical communication module 91 has the isolator 17. The isolator 17 transmits outgoing light emitted from the light emitting module 14 to the optical filter 13. Further, the isolator 17 interrupts return light reflected by the optical filter 13 and/or on the incident/outgoing end face of the optical fiber 41 to the light emitting module 14. As the isolator 17, a magnetic optical material passing light only in one way, for example, a garnet ferrite material or garnet ferrite ceramic material can be used. The isolator 17 can interrupt return light to the light emitting module 14, that is, the light emitting device 21. Therefore, since erroneous operation of the light emitting device 21 can be prevented, the light emitting module 14 can perform stable operation.

Figure 3:
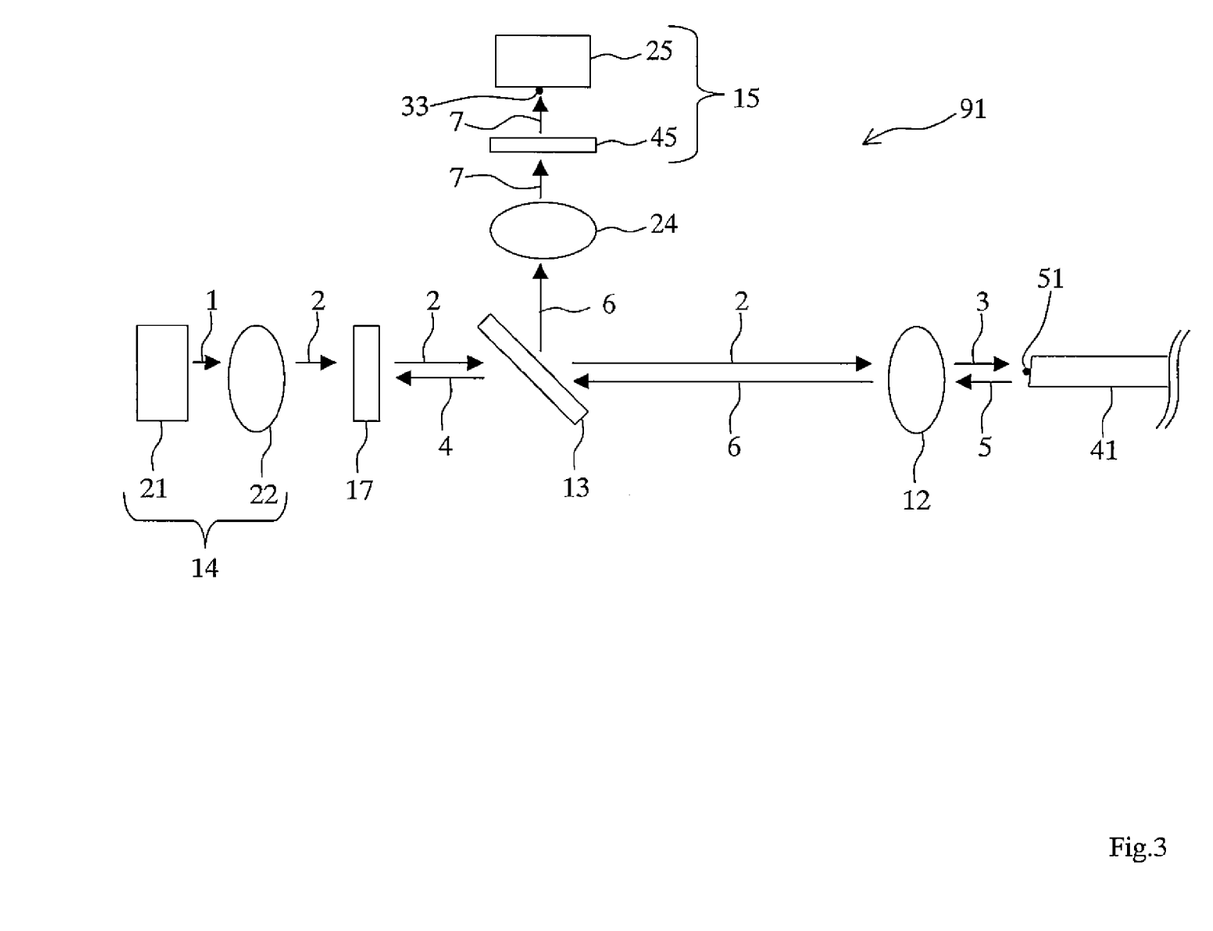
FIG. 3 is a schematic view showing an example of an optical system of the single-fiber two-way optical communication module.

The operation of the single-fiber two-way optical communication module 91 is described with reference to FIG. 3. FIG. 3 is a schematic view showing an example of an optical system of the single-fiber two-way optical communication module 91 illustrated in FIG. 1. In FIG. 3, the optical fiber 41, optical-fiber-side lens 12, optical filter 13, light emitting device 21, light-emission-side lens 22, light-reception-side lens 24, light receiving device 25, isolator 17, and wavelength selection filter 45 illustrated in FIG. 1 are shown.

First, the transmitting operation is described. The outgoing light 1 emitted from the light emitting device 21 is refracted so as to become the parallel rays 2 by the light-emission-side lens 22. The parallel rays 2 transmit the isolator 17 and the optical filter 13 and enter the optical-fiber-side lens 12. The parallel rays 2 are condensed by the optical-fiber-side lens 12 to the predetermined position 51 which coincides with the incident/outgoing end face of the optical fiber 41, and condensed light 3 enters the optical fiber 41. By the above operations, the outgoing light 1 emitted from the light emitting device 21 can enter the optical fiber 41. That is, a light signal can be transmitted.

Since the light emitting module 14 can emit the parallel rays 2, adjustment of the coupling system is facilitated, and light coupling efficiency can be improved. Since transmission light to the optical filter 13 is parallel rays, aberration can be reduced. Since the optical-fiber-side lens 12 condenses the parallel rays 2 to the incident/outgoing end face of the optical fiber 41, the light coupling efficiency can be improved. The incident/outgoing end face of the optical fiber 41 is disposed in the predetermined position 51 by the optical fiber holding sleeve 11. The optical axis of the optical fiber 41 is fixed by the optical fiber holding sleeve 11. Therefore, the light emitting module 14 and the single-fiber two-way optical communication module realizing improved light coupling efficiency can be provided.

Next, the receiving operation is described. Light 5 emitted from the optical fiber 41 is refracted by the optical-fiber-side lens 12 so as to become parallel rays 6. The parallel rays 6 are reflected by the optical filter 13 and enter the light-reception-side lens 24. The parallel rays 6 are refracted by the light-reception-side lens 24 so as to be condensed to the predetermined focal point 33 and become light 7. The light 7 passes through the wavelength selection filter 45 and only a reception wavelength emitted from the optical fiber is condensed to the predetermined focal point 33. The light 7 condensed to the predetermined focal point 33 enters the light emitting device 25 whose light receiving face is disposed in the predetermined focal point 33. By the above operations, a light signal emitted from the optical fiber 41 can be received.

Since the parallel rays 6 reflected by the optical filter 13 and separated from the predetermined optical path are parallel rays, the parallel rays 6 after splitting can enter stably the light-reception-side lens 24. The light receiving face of the light receiving device 25 can be positioned in the predetermined focal point 33 by the light receiving module holding sleeve 26 at the time of fixing the light receiving module holding sleeve. The optical axis of the light receiving device 25 can be also adjusted to the optical axis of the light-reception-side lens 24 by the light receiving module holding sleeve 26 at the time of fixing the light receiving module holding sleeve. Therefore, the light receiving module 15 can efficiently receive the parallel rays separated from the predetermined optical path. Thus, the single-fiber two-way optical communication module realizing improved light coupling efficiency can be provided.

In FIG. 1, the light emitting module 14 is not limited to be disposed on the predetermined optical path 101. For example, it may be disposed on the optical path 102. In this case, the optical path 102 is an optical path in which parallel rays emitted from the light emitting module 14 are coupled to parallel rays propagating toward the optical-fiber-side lens 12 in the predetermined optical path 101 by the optical filter 13. That is, the optical filter 13 is preferably disposed in the direction so that light emitted from the light emitting module 14 can enter the optical-fiber-side lens 12. The light receiving module 15 and the light-reception-side lens 24 are not limited to be disposed on the separate optical path 102. For example, they may be disposed on the predetermined optical path 101. In this case, the light receiving module 15 is disposed so that the direction from the predetermined focal point 33 to the optical center 34 of the light-reception-side lens 24 is directed to the optical filter 13. That is, the light receiving face 36 of the light receiving device 25 is directed to the optical filter 13.

Figure 4:
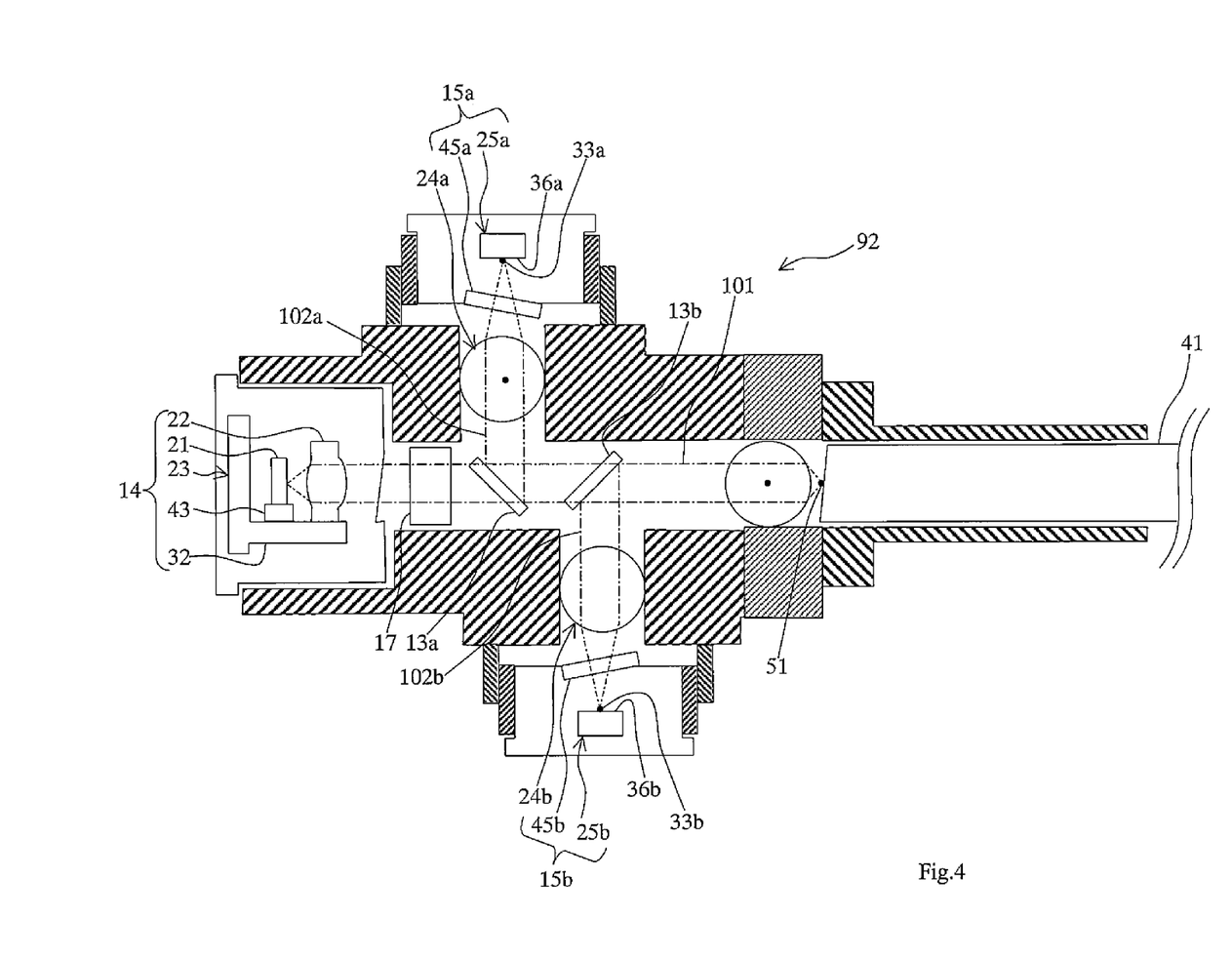
FIG. 4 is a schematic view showing another example of the single-fiber two-way optical communication module of the embodiment.

Although one optical filter 13, one light emitting module 14, one light receiving module 15, and one isolator 17 are provided in FIG. 1, the invention is not limited to the configuration. FIG. 4 is a schematic view showing another example of the single-fiber two-way optical communication module according to the embodiment. The single-fiber two-way optical communication module 92 shown in FIG. 4 has optical filters 13a and 13b in place of the optical filter 13 in the single-fiber two-way optical communication module 91 shown in FIG. 1 and has light receiving modules 15a and 15b in place of the light receiving module 15. In the single-fiber two-way optical communication module 92, an incident/outgoing end face 51 of the optical fiber 41, optical-fiber-side lens 12, optical filters 13b and 13a, isolator 17, and light emitting module 14 are disposed in order on the predetermined optical path 101. The light receiving module 15a is disposed on an optical path 102a split from the predetermined optical path 101 by the optical filter 13a.

The light receiving module 15b is disposed on the optical path 102b split from the predetermined optical path 101 by the optical filter 13b. As the light receiving modules 15a and 15b, light receiving modules similar to the light receiving module 15 described above with reference to FIG. 1 can be used. As the optical filters 13a and 13b, optical filters similar to the optical filter 13 described above with reference to FIG. 1 can be used.

As shown in FIG. 4, the single-fiber two-way optical communication module 92 may have two or more optical filters 13, two or more light emitting modules 14, and two or more light receiving modules 15 or isolators 17. In the single-fiber two-way optical communication modules 91 and 92, splitting of light to the light receiving module 15 or coupling of light from the light emitting module 14 can be performed with parallel rays. Consequently, also in the case of coupling light from two or more light emitting modules 14 by the optical filter and splitting the light from the optical fiber 41 to two or more light receiving modules 15, deterioration in the light coupling efficiency can be prevented. Further, the light emitting module can emit parallel rays and the light receiving module can receive parallel rays, so that the single-fiber two-way optical communication module to/from which the light emitting module and the light receiving module can be attached/detached without deteriorating the light coupling efficiency can be also provided.

As described above, the single-fiber two-way optical communication module 91 can split or couple parallel rays as transmission/reception light, so that adjustment of the coupling system is easy and the transmission/reception light can be stably split or coupled. The optical-fiber-side lens 12 can make light from the light emitting device 21 efficiently enter the optical fiber 41, and the reception-side lens 24 can make light efficiently enter the light receiving device 25. Further, the light emitting device 21 and the light-emission-side lens 22 are held side by side in the light outgoing direction on the stem, so that the light emitting module 14 can efficiently emit, light emitted from the light emitting device 21 as parallel rays. Therefore, the light emitting module and the single-fiber two-way optical communication module realizing improved light coupling efficiency can be provided.

According to the present invention, the light emitting module can be used not only for optical communication but also as a gas sensor since the light emitting module emits collimator light. Since light emitted from the optical fiber or the light emitting device can be split to a plurality of optical paths, the light emitting module can be also used as an illuminating device.

What is claimed is:

1. A single-fiber two-way optical communication module comprising:

a light emitting module including a light emitting device for emitting light, a light-emission-side lens for refracting outgoing light emitted from the light emitting device to parallel rays, a heat sink having thereon the light emitting device, for dissipating heat from the light emitting device, and a stem having a column-shaped holding part which extends in a direction parallel with an outgoing direction of the light emitting device, and holding the light-emission-side lens and the heat sink on a side face of the holding part;

an optical fiber holding sleeve for holding an optical fiber whose incident/outgoing end face is disposed in a predetermined position;

an optical-fiber-side lens for refracting light emitted from the predetermined position to parallel rays in a predetermined optical path and condensing the parallel rays entered from the predetermined optical path to the predetermined position;

at least one optical filter disposed on the predetermined optical path, for splitting the parallel rays in the predetermined optical path or coupling the parallel rays in an optical path crossing the predetermined optical path to the predetermined optical path;

at least one light-reception-side lens for condensing the parallel rays to a predetermined focal point;

at least one light receiving module including a light receiving device for receiving the light condensed to the predetermined focal point;

at least one light receiving module holding ring for holding the light receiving module;

at least one light receiving module holding sleeve for holding the light receiving module holding ring on the inside of a cylinder having a center axis almost parallel with the optical axis of the light-reception-side lens and making a light receiving surface of the light receiving device and the predetermined focal point coincide with each other; and a casing for holding the optical fiber holding sleeve, the optical-fiber-side lens, the optical filter, the light emitting module, and the light-reception-side lens, and holding the light receiving module holding sleeve that is movable on a plane almost perpendicular to the optical axis of the light-reception-side lens, wherein the light emitting module is disposed on the predetermined optical path or an optical path where the emitting light from the light emitting device is directed to the optical-fiber-side lens by the optical filter so that an outgoing direction of the light emitting device is set toward the optical filter, and the light receiving module is disposed on the predetermined optical path or an optical path refracted from parallel rays in the predetermined optical path by the optical filter so that a direction from the predetermined focal point to an optical center of the light-reception-side lens is set toward the optical filter.

* * * * *